Patented Sept. 29, 1931

1,825,620

UNITED STATES PATENT OFFICE

ROY EDWIN COLEMAN, OF MERIDEN, CONNECTICUT, ASSIGNOR, BY MESNE ASSIGNMENTS, TO THE MONOWATT ELECTRIC CORPORATION, OF BRIDGEPORT, CONNECTICUT, A CORPORATION OF CONNECTICUT

COLORED COLD MOLDED INSULATION

No Drawing. Application filed November 18, 1926. Serial No. 149,273.

My invention relates to a colored cold molded insulation.

At the present time, cold molded insulation, so called, has come into extensive use for electrical fittings and the like, but, such cold molded product, due to the presence of asphalt in the mixture, has usually been black or slightly grayish in appearance probably due to the light colored asbestos and the black asphalt. One example of such a cold molded product and method of making the same is described in the Groten Patent 1,517,360, dated December 2, 1924.

There has been an insistent demand for colored material of the type mentioned, and the demand has been particularly insistent for clear, definite, brown, red and green colors. Up to the time of the present invention, do not believe that any colored, and particularly a brown, cold molded insulation has been made, which could truly be called a colored insulation, in which the color is quite definite, clear and uniform, and which does not exhibit substantial spots or segregations of color pigment so as to produce a muddy or indefinite color.

Heretofore, attempts to produce colored cold molded insulation of the character indicated have been without material success, in that the colors produced were not definite, clear and uniform, and the surface of the finished article often exhibited a spotted or a muddy appearance, due probably to the segregation of the color pigment causing a substantially spotted condition, which detracted from the appearance of the article.

It is the principal object of the present invention to produce a commercially practicable colored cold molded insulation, in which the color pigment is so widely and uniformly distributed and dispersed that the finished article will be of definite, clear color, not indefinite and not substantially spotted in appearance.

In carrying out my invention I may follow substantially the procedure outlined in Groten patent above identified, except that color is added in such a way as to produce the result I desire to attain. Generally speaking, the range of proportions given in the Groten patent may be employed. A preferred procedure is as follows:

Raw linseed oil (about 3840 lbs.) is pumped into a tank provided with heating means; a small quantity (say 380 lbs.) of resin or gum, such as East India copal chips or hard asphalts, like gilsonite, is then added, and the temperature of the tank is raised to, say, 400° F. and held at that temperature for about twelve hours or until the oil is properly bodied. The contents of the tank are mechanically agitated so as to produce a homogeneous mixture. The gum or hard asphalts are dissolved and dispersed in the linseed oil and the latter bodied. The tank may then be cooled somewhat, say to 300° F., and a small quantity (about 120 lbs.) of drier, such as manganese linoleate, added. The temperature may then be increased to, say, 380° F. and bituminous material such as asphalt added. This bituminous material may consist of about 3500 lbs. of blown asphalt and about 3500 lbs. of steam distilled asphalt. This temperature is maintained for a sufficient length of time to melt the bituminous material and thoroughly disperse the same, so as to produce a homogeneous mixture. In order to assist in the thorough mixing and dispersion of these various ingredients, a dispersing agent, which may be linseed oil fatty acid (about 150 lbs.), may be added. This latter addition, as is more fully set forth and claimed in application, Serial No. 301,699, filed August 23, 1928, seems to facilitate the dispersion and intimate mixture of the various ingredients, even though the quantity of fatty acids used is very small. After continued heating and mixing this black mixture becomes the binder, which is later mixed with finely divided asbestos or other filler. A binder, as herein specifically described, is designed to be poured onto the filler while hot, but the invention contemplates the use also of such binders as employ solvents or thinners rather than elevated temperatures to secure fluidity. A product formed of this binder would be black, due to the large amount of asphalt usually employed.

When it is desired to make a colored product I may add a color pigment to the binder above described, either at the end of the process of making the binder, or at some intermediate stage. The color pigment may also be mixed with a filler before the binder is added, or to the binder before it is mixed with the filler, or to the mixture of binder and filler at any suitable stage of the mixing.

As above indicated, the failure to attain a commercial, satisfactorily colored product heretofore has been due, I believe, to the fact that the color pigment was not sufficiently uniformly distributed and dispersed so as to form a uniformly colored product. In order to attain the desired result, I subdivide the particles or particle agglomerates of the powdered color pigment into more minute particles or agglomerates so that they may be easily and uniformly distributed and dispersed throughout the composition. This I accomplish either by the use of an active dispersing agent or by dispersing the color pigment in a liquid dispersing medium with the aid of mechanical means, such as mixing or grinding, or by a combination of mixing or grinding, and an active dispersing agent in a dispersing medium, or by an active dispersing agent with the aid of mixing or grinding, and thus causing the color pigment to be easily and uniformly distributed throughout the filler, binder, or the mixed mass.

By an active dispersing agent, I mean one such as blown linseed oil, which will widely disperse the particles or particle agglomerates. By "dispersing material" I mean one which will not tend to cause coalescence or coagulation of the particles or particle agglomerates.

The preferred way of attaining this dispersion of the color pigment is to mix the powdered pigment with a suitable dispersing medium and grinding them together so as to cause an intimate contact of the pigment particles with the medium and subdivide the particles or agglomerates. The degree of dispersion of the color pigment in the medium is influenced by the activity of the medium as a dispersing agent. A satisfactory dispersing medium is linseed oil or any other dispersing liquid miscible with the binder. The combination of bodied linseed oil and copal gum, cited below, has also good dispersing properties and acts to a degree as an active dispersing agent. As a specific example of one way of preparing color pigment properly dispersed in a dispersing medium, I may cite the following:

About 22 pounds of bodied linseed oil and copal gum (which may be taken from the binder tank) is mixed with about 30 pounds of powdered iron oxide. The minimum amount of dispersing medium to be employed varies somewhat with each pigment, and even with different lots of the same pigment, depending upon the absorption properties of the latter. This dispersing medium and the color pigment may then be ground in an ordinary paint grinder or other equipment, and the resulting product is rather a thick paste resembling in consistency a soft cup grease.

It is believed that, in a color pigment so ground, a large part of the particles or particle agglomerates have been reduced to a size and dispersed to a degree well within the range of colloidal dispersion. While I now consider it most advantageous to grind the color pigment in the dispersing medium, that may not always be necessary, for the color pigment may be adequately dispersed by mixing (without grinding) with some active dispersing agent. Even in this case, grinding or mechanical attrition would tend to improve the extent of dispersion of the color pigment in the dispersing medium. It is the uniform distribution and dispersion of the color pigment in the finished product, which is the desired result to be attained.

This prepared color pigment may be mixed with the filler before the binder is added, or to the binder before its mixing with the filler, or to the mixture of binder and filler at any suitable stage of the mixing. I now deem it best, however, to mix the prepared color pigment with the binder prior to its admixture with the filler.

In a specific example of a preferred method of carrying out the invention, I mix a suitable quantity (say 25 lbs.) of the colored binder with finely divided filler material, such as finely divided asbestos fiber (about 100 lbs.), and continue the mixing until a homogeneous mixture is produced, and the filler material coated with the binder. The filler may contain other matter such as talc (about 20 lbs.) or similar material. It is desirable under certain conditions to treat the filler or add to the binder some reagent, such as pine oil, which will assist in causing the colored binder to wet the filler. By this means, the particles of some fillers are more uniformly coated and a more satisfactory product produced.

After sufficient mixing, the product is in rather a finely divided form, being a mixture of granular and fibrous particles and a portion in the form of small pellets. The mixture is cured by exposure to the air or preferably at an elevated temperature in ovens, so as to hasten oxidation of the linseed oil, and then screened. The powder is then pressed in suitable presses at appropriate pressures, depending upon the character and size of the article to be made, and the pressed articles then baked until they become of permanent character. A suitable baking temperature for most purposes is about 380° F.

A product made according to the above process will be uniformly colored and, due to the wide and uniform dispersion of the color pigment, will have a definite color and be free from any appreciable spotted or muddy appearance, and there will be substantially no patches of segregated color pigment, such as are often present when the undispersed pigment is added and an attempt made to disperse the color pigment merely by mixing. By dispersing the color pigment I am able to produce many shades of uniform colors or mixtures of colors. My improved colored product may be easily buffed and takes a high polish.

While I consider it preferable to mix the dispersed color pigment with the binder as above described, it is also feasible to mix the dispersed color pigment with the filler and then add the binder. In the latter case it would be desirable to have the dispersed color pigment quite liquid in character, so as to produce a good coating of the pigment on the filler. The dispersed color could be ground in an excess of dispersing medium, or the paste form of dispersed color previously described could be suitably thinned before being applied to the filler. It is also possible to mix the binder with the filler and thereafter add the dispersed color pigment, as mentioned above. The dispersion of the color pigment, regardless of how or when effected, is the important thing.

Whether the color pigment is dispersed in a dispersing medium before addition to other constituents of the product, or the color pigment is added to one or more of the constituents of the product and then dispersed, the desired result will be attained, and I wish to include such other methods, except where otherwise indicated by the claims. For example, the color pigment may be added in a dry state to the filler material and then dispersed by the addition of, and mixing with, an active dispersing agent, such as pine oil, and thereafter the binder may be added. Again, I may mix the undispersed pigment with the filler and thereafter add a binder which itself has properties of an active dispersing agent, and thereby disperse the color pigment. The binder mentioned above has active dispersing properties.

I believe I am the first to produce a colored cold molded insulation in which the colors are clear and definite, due to the uniform distribution and dispersion of the color pigment.

While I have described the invention particularly as relating to brown insulation, chrome green and other colors may be dispersed and treated in substantially the same way.

The invention has been described particularly in connection with a bituminous binder, but, except as herein otherwise limited, I do not wish to be confined to such binders; for example, the binder may be such as to contain no bituminous material. Such a binder may be composed of a varnish-like base, including drying and semi-drying oils, lime, resins, etc., properly treated and compounded; and such a binder is not black but relatively clear and translucent. Such a non-bituminous binder is more fully described in application, Serial No. 301,700, filed Aug. 23, 1928.

The invention has been described in connection with a process which has proved entirely satisfactory commercially, but I do not wish to be confined to the particular binder or filler described, since there are other binder or filler compositions and fillers, and my method of producing a colored cold molded insulation with such other binders and fillers is, except as limited by the claims, within the contemplation of my invention.

The term "cold molded insulation" is used at the present time to indicate a product formed by a process in which the moldable material, usually in powdered or granular or fibrous condition, is pressed to the desired form, and thereafter baked at an elevated temperature until the article becomes hard and permanent in character. The term "cold molded" does not necessarily mean that the molding dies are cold or at room temperature, since such dies may and sometimes are artificially heated so as to produce a better flow and to improve the appearance of the finished article. In the so-called cold molded process the articles, after being pressed, are usually immediately removed from the dies and thereafter baked. In the entirely distinct so-called "hot molded process", the moldable composition is pressed in dies at an elevated temperature and maintained at such temperature, and under pressure, until the product is formed and the necessary chemical and physical changes or both occur, and the article, upon emerging from the dies, is of permanent character and requires no further baking or like heat treatment.

I claim:

1. The method of making a brown cold molded insulation product which includes, heating and mixing together a drying oil, a resin of the copal type and an asphaltic material, grinding finely divided iron oxide with a dispersing medium including linseed oil so as to widely disperse the iron oxide, adding the iron oxide dispersed in the dispersing medium to the first mentioned heated mixture, and mixing until a homogeneous binder mass is produced, mixing the binder mass with inert filler material until a homogeneous mass is produced in the form of individual granules or pellets, the proportions of binder and filler being such that the mass produced is cold moldable, curing the mass, then pressing into the desired shapes, and then baking the pressed articles until they become hard and permanent in character.

2. The method of making a colored cold moldable composition which comprises an asphaltic binder and filler in relative proportions to produce a final product which is hard and permanent in character and a pigment, which includes dispersing the pigment in a liquid dispersing medium and mixing the dispersed pigment, binder and filler until a substantially homogeneous mass is produced.

3. The method of making a colored cold moldable composition which comprises an asphaltic binder comprising at least two ingredients and a filler in relative proportion to the binder to produce a final product which is hard and permanent in character and a pigment, which includes dispersing the pigment in a liquid dispersing medium, the dispersing medium being a part at least of one of the binder ingredients, and mixing the dispersed pigment, binder and filler until a substantially homogeneous mass is produced.

4. The method of making a colored cold moldable composition which comprises an asphaltic binder and filler in relative proportions to produce a final product which is hard and permanent in character and a pigment, which includes dispersing the pigment in a liquid dispersing medium comprising linseed oil, and mixing the dispersed pigment, binder and filler until a substantially homogeneous mass is produced.

5. The method of making a colored cold moldable composition which comprises an asphaltic binder and filler in relative proportions to produce a final product which is hard and permanent in character and a pigment, which includes grinding the pigment in a mixture comprising drying oil and a resin of the copal type to widely disperse the pigment, and mixing the dispersed pigment, binder and filler until a substantially homogeneous mass is produced.

6. The method of making a colored cold moldable composition which comprises asbestos, asphalt and drying oil in relative proportions to produce a final product which is hard and permanent in character and a pigment, which includes grinding the pigment in a dispersing medium containing linseed oil and mixing the dispersed pigment, binder and filler until a substantially homogeneous mass is produced.

7. As an article of manufacture, an article of cold molded insulation, including a filler and a binder including an asphaltic substance, a drying oil, resinous material and a pigment of finely divided iron oxide, said pigment being widely and uniformly dispersed in the finished product so as to produce in the finished product a clear, brown color, said article being free from substantial patches of segregated particles of pigment and exhibiting a substantially uniformly colored appearance, the proportions of filler and binder being such that the article is hard and permanent in character.

8. As an article of manufacture, an article of cold molded insulation formed of a filler and a binder including an asphaltic material, a drying oil and a color pigment, said pigment being substantially uniformly dispersed so as to produce an article having a clear, definite color substantially free from segregated patches of pigment and having substantially no spotted appearance, the proportions of filler and binder being such that the article is hard and permanent in character.

ROY EDWIN COLEMAN.